(12) United States Patent
Muendel et al.

(10) Patent No.: US 11,982,841 B2
(45) Date of Patent: May 14, 2024

(54) LASER BEAM DELIVERY SYSTEM

(71) Applicant: Lumentum Operations LLC, San Jose, CA (US)

(72) Inventors: Martin H. Muendel, Oakland, CA (US); Richard D. Faulhaber, San Carlos, CA (US)

(73) Assignee: Lumentum Operations LLC, San Jose, CA (US)

( * ) Notice: Subject to any disclaimer, the term of this patent is extended or adjusted under 35 U.S.C. 154(b) by 179 days.

(21) Appl. No.: 17/362,300

(22) Filed: Jun. 29, 2021

(65) Prior Publication Data
US 2022/0342154 A1    Oct. 27, 2022

Related U.S. Application Data

(60) Provisional application No. 63/177,688, filed on Apr. 21, 2021.

(51) Int. Cl.
| G02B 6/32 | (2006.01) |
| G02B 6/42 | (2006.01) |
| H01S 3/08 | (2023.01) |
| G02B 5/04 | (2006.01) |
| G02B 6/26 | (2006.01) |

(52) U.S. Cl.
CPC ............ *G02B 6/32* (2013.01); *G02B 6/4296* (2013.01); *H01S 3/08009* (2013.01); *G02B 5/04* (2013.01); *G02B 6/262* (2013.01)

(58) Field of Classification Search
None
See application file for complete search history.

(56) References Cited

U.S. PATENT DOCUMENTS

| 4,997,250 A * | 3/1991 | Ortiz, Jr. ............... G02B 27/09 219/121.75 |
| 9,823,422 B2 | 11/2017 | Muendel et al. |
| 2014/0291308 A1* | 10/2014 | Lasagni ............... B23K 26/00 219/121.75 |
| 2017/0176758 A1* | 6/2017 | Lerner ............... G02B 27/0927 |
| 2020/0276667 A1* | 9/2020 | Filkins ................... G02B 5/001 |

\* cited by examiner

*Primary Examiner* — Chad H Smith
(74) *Attorney, Agent, or Firm* — Harrity & Harrity, LLP (57) ABSTRACT

A laser beam delivery system includes an optical beam launcher device and a waveguide assembly. The optical beam launcher device includes an optical relay system that includes a beam splitting optic that is configured to cause a laser beam that is input into the optical beam launcher device to be split into a first laser sub-beam and a second laser sub-beam, cause the first laser sub-beam to transmit to a first region of an input lens of the waveguide assembly, and cause the second laser sub-beam to transmit to a second region of the input lens. The waveguide assembly is configured to transmit the first laser sub-beam and the second laser sub-beam from the input lens to an output lens of the waveguide assembly, wherein the first laser sub-beam and the second laser sub-beam transmit from the waveguide assembly and form an output laser beam.

20 Claims, 5 Drawing Sheets

LASER BEAM DELIVERY SYSTEM

RELATED APPLICATION

This application claims priority to U.S. Provisional Patent Application No. 63/177,688, entitled "BEAMSHAPING SYSTEM," filed on Apr. 21, 2021, the content of which is incorporated by reference herein in its entirety.

TECHNICAL FIELD

The present disclosure relates generally to a laser beam delivery system and to a beam splitting optic of the laser beam delivery system.

BACKGROUND

Laser material processing has many advantages over conventional material processing, including high productivity, a non-contact nature of processing, improved quality, and high precision and mobility of the laser beam delivery point. Lasers are presently used for cutting, drilling, welding, brazing, surface annealing, alloying, hardening, and other applications. An optical fiber is frequently used to deliver a high-power and/or high-intensity laser beam to a target.

SUMMARY

In some implementations, a laser beam delivery system includes an optical beam launcher device that includes an optical relay system; and a waveguide assembly, wherein: the optical relay system includes a beam splitting optic that is configured to: cause a laser beam that is input into the optical beam launcher device to be split into a first laser sub-beam and a second laser sub-beam, cause the first laser sub-beam to transmit to a first region of an input lens of the waveguide assembly, and cause the second laser sub-beam to transmit to a second region of the input lens of the waveguide assembly; and the waveguide assembly is configured to transmit the first laser sub-beam and the second laser sub-beam from the input lens of the waveguide assembly to an output lens of the waveguide assembly via a waveguide of the waveguide assembly, wherein the first laser sub-beam and the second laser sub-beam transmit from the waveguide assembly and form an output laser beam.

In some implementations, an optical beam launcher device includes a beam splitting optic that is configured to: cause a laser beam that is input into the optical beam launcher device to be split into a first laser sub-beam and a second laser sub-beam; cause the first laser sub-beam to transmit to a first region of an input lens of a waveguide assembly, wherein the first region is associated with a first lateral offset from an optical axis of the input lens of the waveguide assembly; and cause the second laser sub-beam to transmit to a second region of the input lens of the waveguide assembly, wherein the second region is associated with a second lateral offset from the optical axis of the input lens of the waveguide assembly.

In some implementations, a method includes causing, by a beam splitting optic, a laser beam that is input into an optical beam launcher device to be split into a first laser sub-beam and a second laser sub-beam; causing, by the beam splitting optic, the first laser sub-beam to transmit to a first region of an input lens of a waveguide assembly, wherein the first region is associated with a first lateral offset from an optical axis of the input lens of the waveguide assembly; and causing, by the beam splitting optic, the second laser sub-beam to transmit to a second region of the input lens of the waveguide assembly, wherein the second region is associated with a second lateral offset from the optical axis of the input lens of the waveguide assembly.

DETAILED DESCRIPTION

The following detailed description of example implementations refers to the accompanying drawings. The same reference numbers in different drawings may identify the same or similar elements.

A conventional fiber-delivered laser material processing system typically includes: a laser (e.g., a fiber laser); an optical coupler unit (e.g., a switch box or shutter box); a process fiber (also referred to as a "delivery fiber") (e.g., in a reinforced cable and pluggable on one or more ends of the process fiber); and a process head. The process head is an optical assembly that includes a receptacle for the process fiber, optics for projecting the laser power, and any required accessories for laser-based processing, such as assist-gas ports. Laser light is emitted and transmitted from the laser into the optical coupler unit (e.g., through free space or through a separate optical fiber). The optical coupler unit launches the laser light into the process fiber, which transmits the laser light to the process head. The process head projects the laser light onto a workpiece to perform a processing task.

Such systems are used with many different process types, including cutting, drilling, welding, brazing, surface annealing, alloying, hardening, and/or other applications, and with many different material types, thicknesses, and geometries. A desired focal spot size, divergence, and beam quality at the workpiece may vary widely depending on the process type and associated process parameters. To create different spot sizes and/or different divergences of the laser light, one or more lenses of the optical coupler may be adjusted to cause the laser light to enter the process fiber at an offset. However, this creates spots with a single beam feature, either a "spike" (e.g., a center peak) or an annular "ring," which may not be suitable for particular types of processing (e.g., that require multiple beam features, such as a combination of a spike and/or multiple rings).

Some implementations described herein provide a laser beam delivery system (also referred to as a beamforming system) that includes an optical beam launcher device, a waveguide assembly, and/or a process head. The optical beam launcher device may include an input port to input a laser beam into the optical beam launcher device and an optical relay system to relay the laser beam to the waveguide assembly. The optical relay system may include a beam splitting optic that may be configured to split the laser beam into a plurality of laser sub-beams. The beam splitting optic may include one or more surfaces and/or one or more facets to redirect at least some of the laser beam to create the plurality of laser sub-beams. An adjustment component may move the beam splitting optic to cause the beam splitting optic to be in some or all of a transmission path of the laser beam to enable the beam splitting optic to split the laser beam into the plurality of laser sub-beams.

In some implementations, the beam splitting optic may cause the plurality of laser sub-beams to transmit to respective regions of a waveguide input lens of the waveguide assembly. Each region may be associated with a lateral offset from an optical axis of the waveguide input lens. The waveguide input lens may transmit the plurality of laser sub-beams at respective launch angles (e.g., that correspond to the respective regions and/or the respective lateral offsets of the waveguide input lens) into a core of a waveguide of the waveguide assembly. The plurality of laser sub-beams may transmit, via the waveguide, from the waveguide assembly to the process head and may be focused as an output laser beam (e.g., on a target). The output laser beam may be a combination of the plurality of laser sub-beams, and may, accordingly, have a shape that corresponds to the respective lateral offsets associated with the plurality of laser sub-beams.

In this way, some implementations described herein facilitate creation of an output laser beam that includes multiple beam features (e.g., an output laser beam with an output laser beam spike and one or more output laser beam rings or an output laser beam with two or more output laser beam rings). Accordingly, the output laser beam may be configured to facilitate cutting, drilling, welding, brazing, surface annealing, alloying, hardening, and/or other applications associated with a target that requires an output beam with multiple beam features, which is not possible using a conventional single beam feature adjustment technique.

Figure 1A:
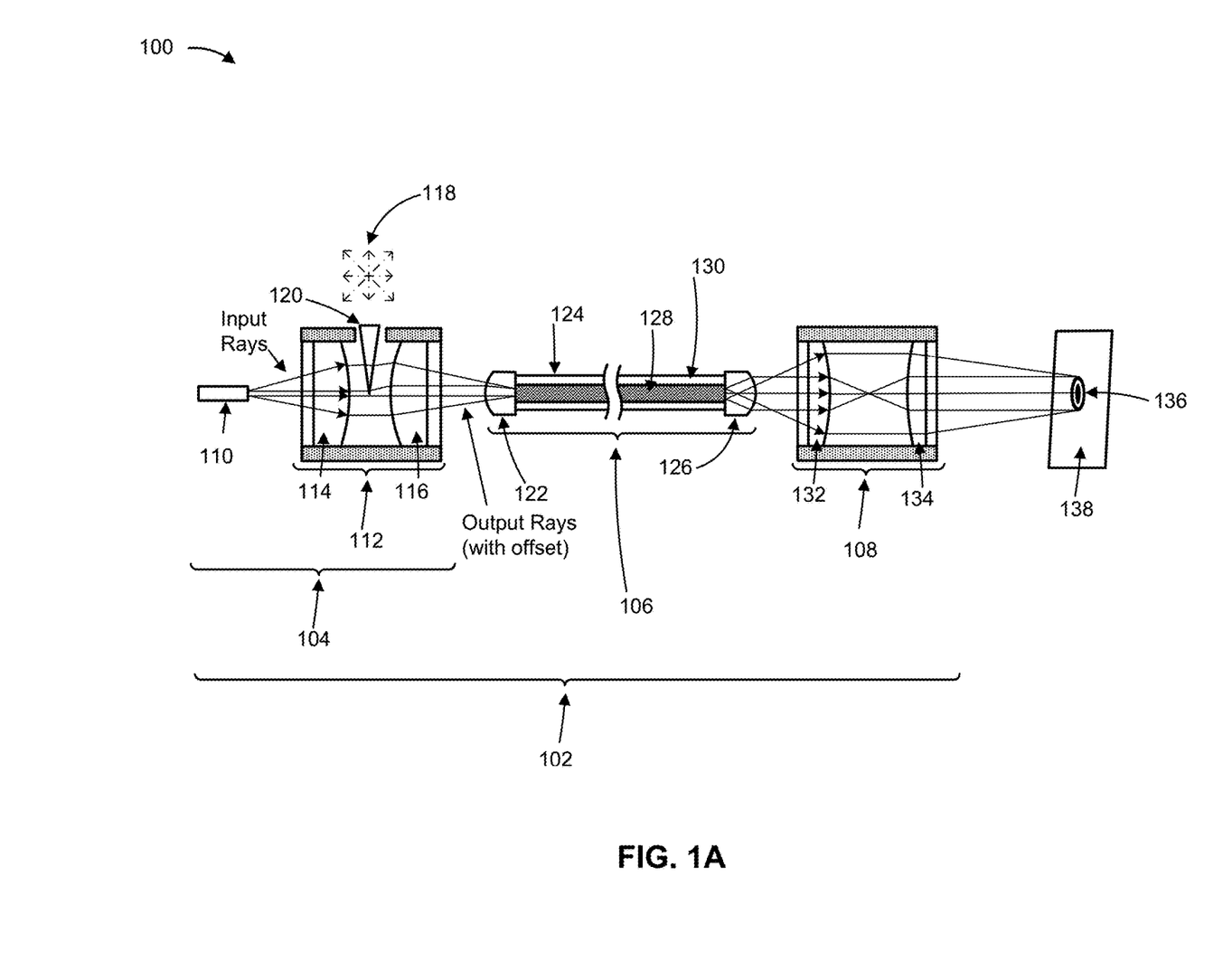
FIGS. 1A-1B are diagrams of example implementations associated with a laser beam delivery system described herein.
Figure 1B:
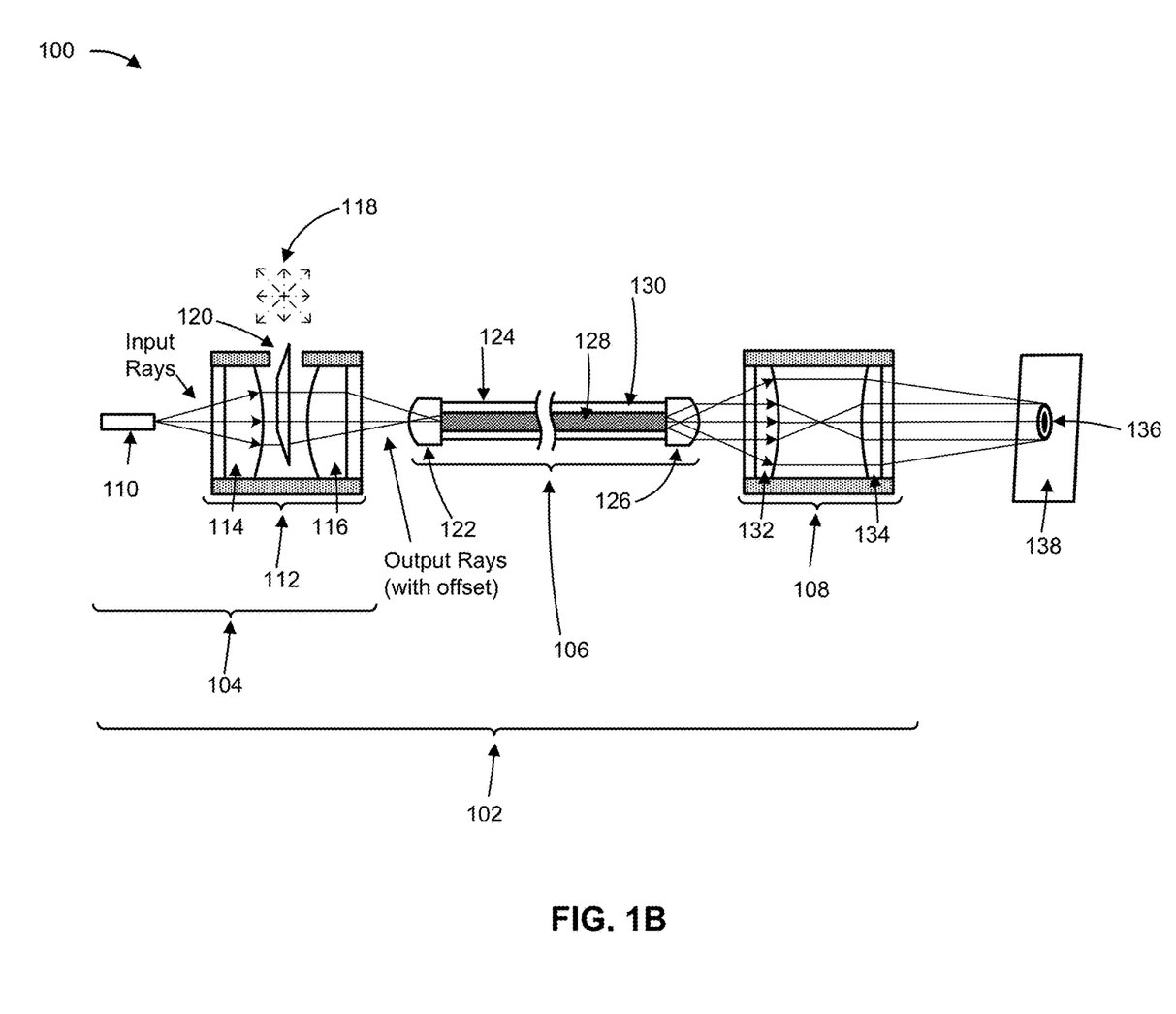

FIGS. 1A-1B are diagrams of example implementations 100 associated with a laser beam delivery system 102 described herein. The laser beam delivery system 102 may enable generation of different output laser beam profiles (e.g., different combinations of a Gaussian-like beam "spike" and/or one or more annular beam "rings"). As shown in FIGS. 1A-1B, the laser beam delivery system 102 may include an optical beam launcher device 104, a waveguide assembly 106, and/or a process head 108.

The optical beam launcher device 104 may include an input port 110 and an optical relay system 112. The input port 110 may be configured to input a laser beam into the optical beam launcher device 104. For example, as shown in FIGS. 1A-1B, the input port 110 may input a laser beam that includes a plurality of input rays (e.g., a plurality of non-parallel input rays).

The optical relay system 112 may be configured to relay the laser beam (e.g., that is input into the optical beam launcher device 104 by the input port 110) to the waveguide assembly 106. In some implementations, the optical relay system 112 may include a first lens 114 (e.g., a collimating lens), a second lens 116 (e.g., a focusing lens), an adjustment component 118, and/or a beam splitting optic 120.

The first lens 114 may be configured to receive the laser beam (e.g., that includes the input rays shown in FIGS. 1A-1B) from the input port 110, to collimate the laser beam (e.g., cause the input rays to be parallel to each other and/or an optical axis of the first lens 114), and to transmit (e.g., within the optical relay system 112) the laser beam to the second lens 116. In some implementations, some or all of the laser beam may transmit to the second lens 116 via the beam splitting optic 120, as described herein.

The adjustment component 118 may be configured to translate, rotate, tilt, or otherwise move the beam splitting optic 120, the first lens 114, and/or the second lens 116 to cause the beam splitting optic 120 to be within some or all of a transmission path of the laser beam between the first lens 114 and the second lens 116. For example, the adjustment component 118 may be configured to adjust a position of the beam splitting optic 120 to cause at least a portion of the beam splitting optic 120 to be within the transmission path of the laser beam when the laser beam is transmitted from the first lens 114 to the second lens 116.

The beam splitting optic 120 may be configured to cause, when the beam splitting optic 120 is within at least some of the transmission path, the laser beam to be split into a plurality of laser sub-beams (e.g., a first laser sub-beam, a second laser sub-beam, and/or one or more additional laser sub-beams). In some implementations, the beam splitting optic 120 may be configured to redirect at least a portion of the laser beam to cause the laser beam to be split into the plurality of laser sub-beams.

For example, when the beam splitting optic 120 is positioned within a portion of the transmission path, a first portion of the laser beam may directly transmit from the first lens 114 to the second lens 116 (e.g., without contacting the beam splitting optic 120) and a second portion of the laser beam may indirectly transmit from the first lens 114 to the second lens 116 via the beam splitting optic 120. Due to one or more optical characteristics of the beam splitting optic 120, the beam splitting optic 120 may redirect the second portion of the laser beam when the second portion of the laser beam falls incident on the beam splitting optic 120. Accordingly, the beam splitting optic 120 may cause (e.g., by redirecting the second portion of the laser beam) the laser beam to be split into a first laser sub-beam (e.g., that includes the first portion of the laser beam) and a second laser sub-beam (e.g., that includes the second portion of the laser beam).

In a particular example, as shown in FIG. 1A, two bottom input rays of an input laser beam may directly transmit from the first lens 114 to the second lens 116 and two top input rays of the laser beam may transmit from the first lens 114 and may fall incident on the beam splitting optic 120. The beam splitting optic 120 may reflect, refract, diffract, and/or otherwise change respective trajectories of the two top input rays, which then may transmit to the second lens 116. Accordingly, the beam splitting optic 120 may cause (e.g., by redirecting the two top input rays) the laser beam to be split into a first laser sub-beam (e.g., that includes the two bottom input rays) and a second laser sub-beam (e.g., that includes the two top input rays).

As another example, when the beam splitting optic 120 is positioned within the transmission path of the laser beam (e.g., an entirety of the transmission path), a first portion of the laser beam and a second portion of the laser beam may each indirectly transmit from the first lens 114 to the second lens 116 via the beam splitting optic 120. Due to one or more optical characteristics of the beam splitting optic 120, the beam splitting optic 120 may redirect at least one of the first portion of the laser beam or the second portion of the laser beam when the first portion of the laser beam and the second portion of the laser beam falls incident on the beam splitting optic 120. Accordingly, the beam splitting optic 120 may cause (e.g., by redirecting at least one of the first portion of the laser beam or the second portion of the laser beam) the laser beam to be split into a first laser sub-beam (e.g., that includes the first portion of the laser beam) and a second laser sub-beam (e.g., that includes the second portion of the laser beam).

In a particular example, as shown in FIG. 1B, three input rays of a laser beam may transmit from the first lens 114 and may fall incident on the beam splitting optic 120. The beam splitting optic 120 may reflect, refract, diffract, and/or otherwise change a trajectory of a bottom input ray, of the three input rays, which then may transmit to the second lens 116. Accordingly, the beam splitting optic 120 may cause (e.g., by redirecting the bottom input ray) the laser beam to be split into a first laser sub-beam (e.g., that includes the two top input rays of the three input rays) and a second laser sub-beam (e.g., that includes the bottom input ray).

In some implementations, the beam splitting optic 120 may be a prism optic, a wedge optic, or a multi-faceted optic. For example, as shown in FIG. 1A, the beam splitting optic 120 may be a prism optic or a wedge optic (e.g., an optic with an angled front surface and/or an angled back surface). As another example, as shown in FIG. 1B, the beam splitting optic 120 may be a multi-faceted optic (e.g., that comprises a front facet and a back facet that are parallel to each other and two side facets that are respectively angled to the front facet and the back facet).

In some implementations, the beam splitting optic 120 may be a multi-faceted optic that includes a plurality of facets arranged in a one-dimensional pattern (e.g., a "row" of facets") or a two dimensional-pattern (e.g., a "grid" of facets) on at least one surface (e.g., an input surface and/or an output surface) of the beam splitting optic 120. Accordingly, the adjustment component 118 may be configured to one-dimensionally or two-dimensionally adjust the position of the beam splitting optic 120 within a transmission path of a laser beam between the first lens 114 and the second lens 116 (e.g., to cause different portions of the laser beam to fall incident on different facets of the plurality of facets of the beam splitting optic 120). In some implementations, at least one facet, of the plurality of facets, may comprise a planar facet and/or at least one facet may comprise a non-planar facet (e.g., a curved, or partially curved, facet). In some implementations, the plurality of facets may include a set of facets with respective sizes (e.g., widths, diameters, or other measurements of size) that satisfy (e.g., that are less than or equal to) a facet size threshold. For example, the set of facets may have respective sizes that are sufficiently small to cause the beam splitting optic 120 to act as an optical diffuser or a beam homogenizer for the laser beam. In some implementations, a facet, of the plurality of facets may have a reflective characteristic, a refractive characteristic, and/or a diffractive characteristic.

In some implementations, the beam splitting optic 120 may comprise a rotationally adjustable optic. For example, the beam splitting optic 120 may comprise a multi-faceted disk optic that includes a plurality of facets azimuthally arranged on at least one surface of the multi-faceted disk optic. The beam splitting optic 120 may have an axis of rotation that is approximately parallel (e.g., within 2 degrees) to an optical axis of the first lens 114 and/or the second lens 116. Accordingly, the adjustment component 118 may be configured to rotationally adjust (e.g., on the axis of rotation of the beam splitting optic 120) the position of the beam splitting optic 120 (e.g., to cause one or more of the plurality of facets to be within the transmission path of the laser beam). As another example, the beam splitting optic 120 may be a multi-faceted polygon optic that includes a plurality of faceted edges. The beam splitting optic 120 may have an axis of rotation that is approximately perpendicular (e.g., within 2 degrees) to the optical axis of the first lens 114 and/or the second lens 116. Accordingly, the adjustment component 118 may be configured to rotationally adjust (e.g., on the axis of rotation of the beam splitting optic 120) the position of the beam splitting optic 120 (e.g., to cause one or more of the plurality of facets to be in the transmission path of the laser beam).

The second lens 116 of the optical beam launcher device 104 may be configured to receive the laser beam (e.g., from the first lens 114 and/or the beam splitting optic 120). For example, the beam splitting optic 120 may split the laser beam into the plurality of laser sub-beams (e.g., as described herein) and may cause the plurality of laser sub-beams to transmit to, and to be received by, the second lens 116. The second lens 116 may be configured to focus the plurality of laser sub-beams at respective regions of a waveguide input lens 122 of the waveguide assembly 106. For example, the second lens 116 may be configured to focus a first laser sub-beam, of the plurality of laser sub-beams, at a first region of the waveguide input lens 122. The first region of the waveguide input lens 122 may be associated with a first lateral offset from an optical axis of the waveguide input lens 122. For example, the first lateral offset may be a "zero" lateral offset (e.g., an offset of 0 micrometers (μm) from the optical axis of the waveguide input lens 122). As another example, the second lens 116 may be configured to focus a second laser sub-beam, of the plurality of laser sub-beams, at a second region of the waveguide input lens 122. The second region of the waveguide input lens 122 may be associated with a second lateral offset from the optical axis of the waveguide input lens 122 of the waveguide assembly. The second lateral offset may be a "non-zero" lateral offset (e.g., an offset that is greater than 0 μm from the optical axis of the waveguide input lens 122, such as a 60 μm offset, a 90 μm offset, or a 120 μm offset from the optical axis of the waveguide input lens 122).

The waveguide assembly 106 may be configured to transmit the laser beam (e.g., that includes the plurality of laser sub-beams) from the optical beam launcher device 104 to the process head 108. In some implementations, the waveguide assembly 106 may include the waveguide input lens 122, a waveguide 124, and/or a waveguide output lens 126.

The waveguide input lens 122 may be configured to receive the plurality of laser sub-beams (e.g., that are included in the laser beam) from the second lens 116 of the optical beam launcher device 104 (e.g., at respective regions of the waveguide input lens 122, as described herein) and to transmit the plurality of laser sub-beams at respective launch angles into a core 128 of the waveguide 124. The respective launch angles may correspond to the respective lateral offsets associated with the plurality of laser sub-beams. For example, the waveguide input lens 122 may transmit a sub-beam associated with a small lateral offset at a small launch angle (e.g., with respect to an optical axis of the waveguide input lens 122) into the core 128 of the waveguide 124 and/or may transmit a sub-beam associated with a large lateral offset at a large launch angle (e.g., with respect to the optical axis of the waveguide input lens 122) into the core 128 of the waveguide 124.

In an example, the waveguide input lens 122 may receive the first laser sub-beam at the first region of the waveguide input lens 122 from the second lens 116 (e.g., as described above) and may transmit the first laser sub-beam at a first launch angle into the core 128 of the waveguide 124. The first launch angle may correspond to the first lateral offset from the optical axis of the waveguide input lens 122. For example, when the first lateral offset is a zero lateral offset, the waveguide input lens 122 may transmit the first laser sub-beam at a first launch angle that is approximately parallel (e.g., within 2 degrees) to the optical axis of the waveguide input lens 122. Additionally, or alternatively, the waveguide input lens 122 may receive the second laser sub-beam at the second region of the waveguide input lens 122 (e.g., as described above) and may transmit the second laser sub-beam at a second launch angle into the core 128 of the waveguide 124. The second launch angle may correspond to the second lateral offset from the optical axis of the waveguide input lens 122. For example, when the second lateral offset is a non-zero lateral offset, the waveguide input lens 122 may transmit the first laser sub-beam at a second launch angle that is not parallel to the optical axis of the waveguide input lens 122 (e.g., a launch angle that is greater than 2 degrees).

In some implementations, the waveguide 124 may comprise the core 128 and a cladding 130. The waveguide 124 may be configured to transmit (e.g., via the core 128) the plurality of laser sub-beams from the waveguide input lens 122 to the waveguide output lens 126. The core 128 may comprise glass and/or another suitable material configured to transmit the plurality of laser sub-beams. The cladding 130 may surround (e.g., circumferentially surround) the core 128 and may be configured to confine the plurality of laser sub-beams (e.g., within the core 128).

The waveguide output lens 126 may be configured to receive the plurality of laser sub-beams from the waveguide 124 and to transmit the plurality of laser sub-beams to the process head 108 of the laser beam delivery system 102.

The process head 108 may include a process head input lens 132 (e.g., a collimating lens) and/or a process head output lens 134 (e.g., a focusing lens). The process head input lens 132 may be configured to receive the plurality of laser sub-beams from the waveguide output lens 126 of the waveguide assembly 106 and to transmit (e.g., within the process head 108) the plurality of laser sub-beams to the process head output lens 134. The process head output lens 134 may be configured to receive the plurality of laser sub-beams and to focus the plurality of laser sub-beams as an output laser beam 136 (e.g., on a target 138, such as a workpiece).

The output laser beam 136 may be a combination of the sub-beams that transmitted from the optical beam launcher device 104, to the waveguide assembly 106, to the process head 108, and/or to the target 138. For example, the output laser beam 136 may include the first laser sub-beam and the second laser-sub beam described herein. In some implementations, the output laser beam 136 may have a shape that corresponds to the respective lateral offsets associated with the plurality of laser sub-beams. For example, the output laser beam 136 may include a laser beam spike and/or one or more output laser beam rings. The laser beam spike may be associated with a laser sub-beam with a zero lateral offset. The one or more output laser beam rings may be associated with one or more laser sub-beams with respective non-zero lateral offsets. The output laser beam 136 is further described herein in relation to FIGS. 2A-2D.

The target 138 may be a workpiece, such as a metal workpiece, and the output laser beam 136 may be configured to facilitate cutting, drilling, welding, brazing, surface annealing, alloying, hardening, and/or other applications associated with the target 138.

As indicated above, FIGS. 1A-1B are provided as an example. Other examples may differ from what is described with regard to FIGS. 1A-1B.

Figure 2A:
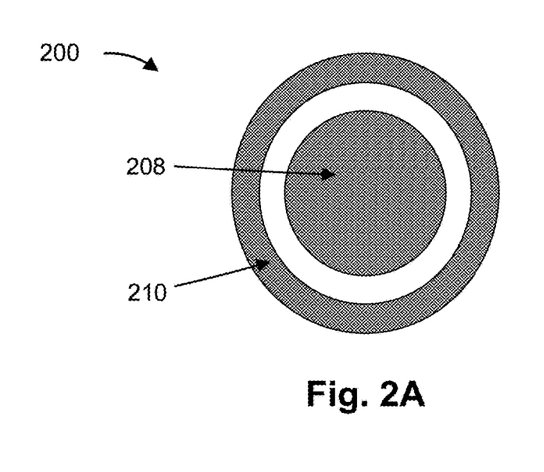
FIGS. 2A-2D are diagrams of example shapes of an output laser beam described herein.

FIGS. 2A-2D are diagrams of example shapes 200, 202, 204, and 206 of the output laser beam 136 described herein. As shown in FIG. 2A, the shape 200 of the output laser beam 136 may include an output laser beam spike 208 and an output laser beam ring 210. The shape 200 may be formed, for example, when the beam splitting optic 120 splits a laser beam into a first laser sub-beam and a second laser sub-beam and causes the first laser-sub beam to transmit to a first region of the waveguide input lens 122 of the waveguide assembly 106 (e.g., that is associated with a zero lateral offset from an optical axis of the waveguide input lens 122) and causes the second laser-sub beam to transmit to a second region of the waveguide input lens 122 (e.g., that is associated with a non-zero lateral offset from the optical axis of the waveguide input lens 122). The first laser sub-beam and the second laser sub-beam then may transmit (e.g., via the waveguide assembly 106 and/or the process head 108) to respectively form the output laser beam spike 208 (e.g., with a zero lateral offset) and the output laser beam ring 210 (e.g., with a non-zero lateral offset) on the target 138.

Figure 2B:
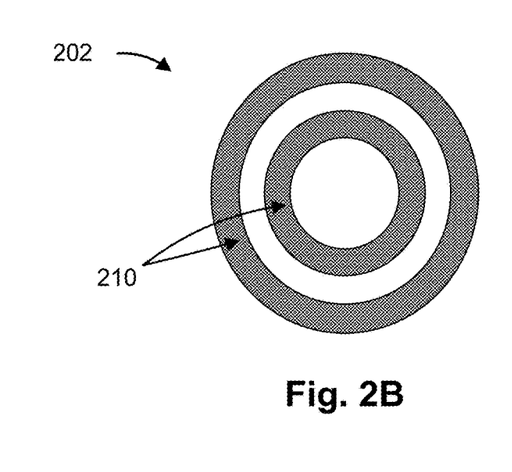

As shown in FIG. 2B, the shape 202 of the output laser beam 136 may include two output laser beam rings 210. The shape 202 may be formed, for example, when the beam splitting optic 120 splits a laser beam into a first laser sub-beam and a second laser sub-beam and causes the first laser-sub beam to transmit to a first region of the waveguide input lens 122 of the waveguide assembly 106 (e.g., that is associated with a first non-zero lateral offset from an optical axis of the waveguide input lens 122) and causes the second laser-sub beam to transmit to a second region of the waveguide input lens 122 (e.g., that is associated with a second non-zero lateral offset from the optical axis of the waveguide input lens 122). The first laser sub-beam and the second laser sub-beam then may transmit (e.g., via the waveguide assembly 106 and/or the process head 108) to respectively form a first output laser beam ring 210 (e.g., with a first non-zero lateral offset) and a second output laser beam ring 210 (e.g., with a second non-zero lateral offset) on the target 138.

Figure 2C:
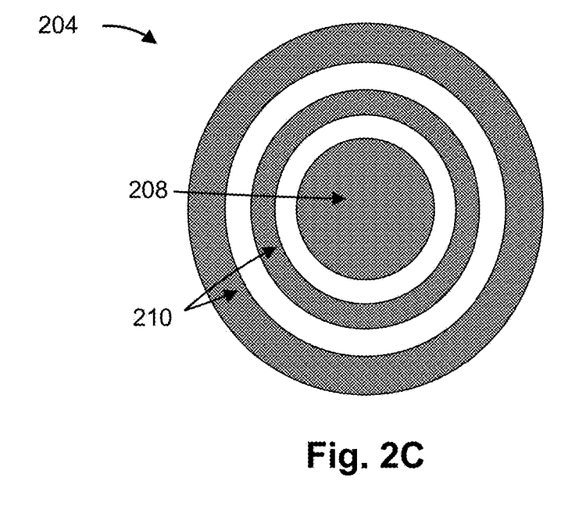

As shown in FIG. 2C, the shape 206 of the output laser beam 136 may include an output laser beam spike 208 and two output laser beam rings 210. The shape 204 may be formed, for example, when the beam splitting optic 120 splits a laser beam into a first laser sub-beam, a second laser sub-beam, and a third laser sub-beam, and causes the first laser-sub beam to transmit to a first region of the waveguide input lens 122 of the waveguide assembly 106 (e.g., that is associated with a zero lateral offset from an optical axis of the waveguide input lens 122), causes the second laser-sub beam to transmit to a second region of the waveguide input lens 122 (e.g., that is associated with a first non-zero lateral offset from the optical axis of the waveguide input lens 122), and causes the third laser-sub beam to transmit to a third region of the waveguide input lens 122 (e.g., that is associated with a second non-zero lateral offset from the optical axis of the waveguide input lens 122). The first laser sub-beam, the second laser sub-beam, and the third laser sub-beam then may transmit (e.g., via the waveguide assembly 106 and/or the process head 108) to respectively form the output laser beam spike 208 (e.g., with a zero lateral offset), a first output laser beam ring 210 (e.g., with a first non-zero lateral offset), and a second output laser beam ring 210 (e.g., with a second non-zero lateral offset) on the target 138.

Figure 2D:
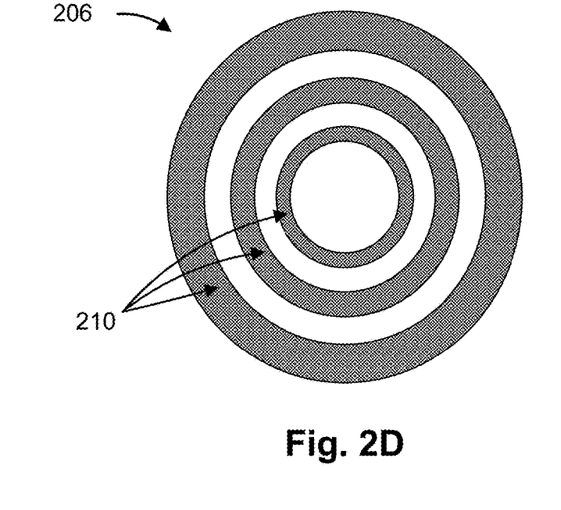

As shown in FIG. 2D, the shape 206 of the output laser beam 136 may include three output laser beam rings 210. The shape 206 may be formed, for example, when the beam splitting optic 120 splits a laser beam into a first laser sub-beam, a second laser sub-beam, and a third laser sub-beam and causes the first laser-sub beam to transmit to a first region of the waveguide input lens 122 of the waveguide assembly 106 (e.g., that is associated with a first non-zero lateral offset from an optical axis of the waveguide input lens 122), causes the second laser-sub beam to transmit to a second region of the waveguide input lens 122 (e.g., that is associated with a second non-zero lateral offset from the optical axis of the waveguide input lens 122), and causes the third laser-sub beam to transmit to a third region of the waveguide input lens 122 (e.g., that is associated with a third non-zero lateral offset from the optical axis of the waveguide input lens 122). The first laser sub-beam, the second laser sub-beam, and the third laser sub-beam then may transmit (e.g., via the waveguide assembly 106 and/or the process head 108) to respectively form a first output laser beam ring 210 (e.g., with a first non-zero lateral offset), a second output laser beam ring 210 (e.g., with a second non-zero lateral offset), and a third output laser beam ring 210 (e.g., with a third non-zero lateral offset) on the target 138.

As indicated above, FIGS. 2A-2D are provided as an example. Other examples may differ from what is described with regard to FIGS. 2A-2D.

Figure 3:
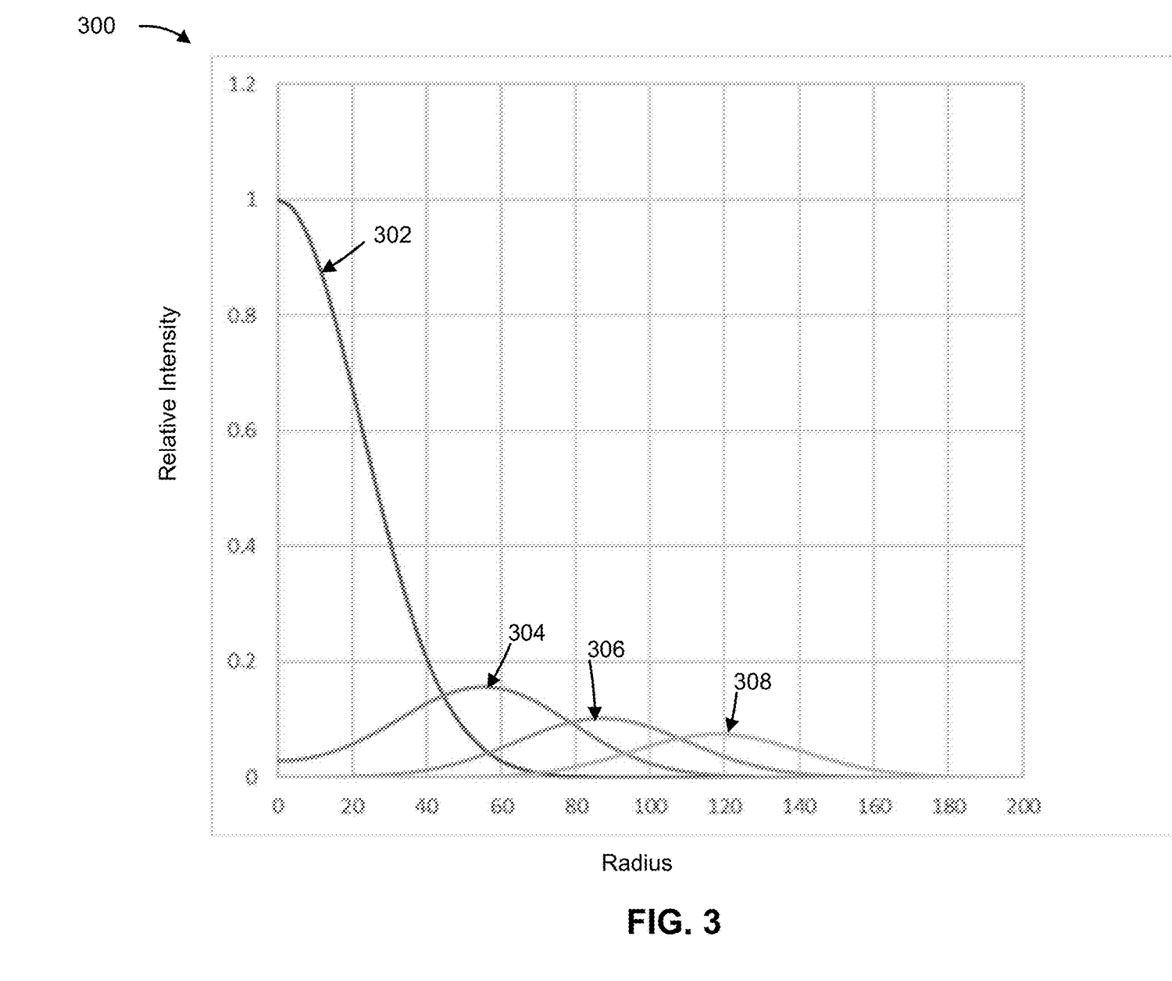
FIG. 3 is a plot illustrating example intensity profiles for laser sub-beams of an input laser beam that are formed by a beam splitting optic described herein.

FIG. 3 is a plot 300 illustrating example intensity profiles (e.g., relative intensities) as a function of radius (e.g., a distance, in micrometers (μm), from a laser sub-beam center) for four laser sub-beams 302-308 of an input laser beam (e.g., with a $1/e^2$ radius of approximately 45 micrometers (μm)) that are formed by the beam splitting optic 120. The four laser sub-beams may be respectively associated with a particular offset amount. For example, the laser sub-beam 302 may be associated with a zero offset, the laser sub-beam 304 may be associated with a 60 μm offset, the laser sub-beam 306 may be associated with a 90 μm offset, and the laser sub-beam 308 may be associated with a 120 μm offset. Each laser sub-beam may transmit (e.g., via the waveguide assembly 106 and/or the process head 108) to the target 138 (e.g., to form an output laser beam spike 208 or an output laser beam ring 210 of the output laser beam 136). As shown in FIG. 3, for each laser sub-beam, a maximum intensity decreases when an amount of offset associated with the laser sub-beam increases. This is because, in larger output laser beam rings 210, beam power is spread over a larger area.

As indicated above, FIG. 3 is provided as an example. Other examples may differ from what is described with regard to FIG. 3.

Figure 4:
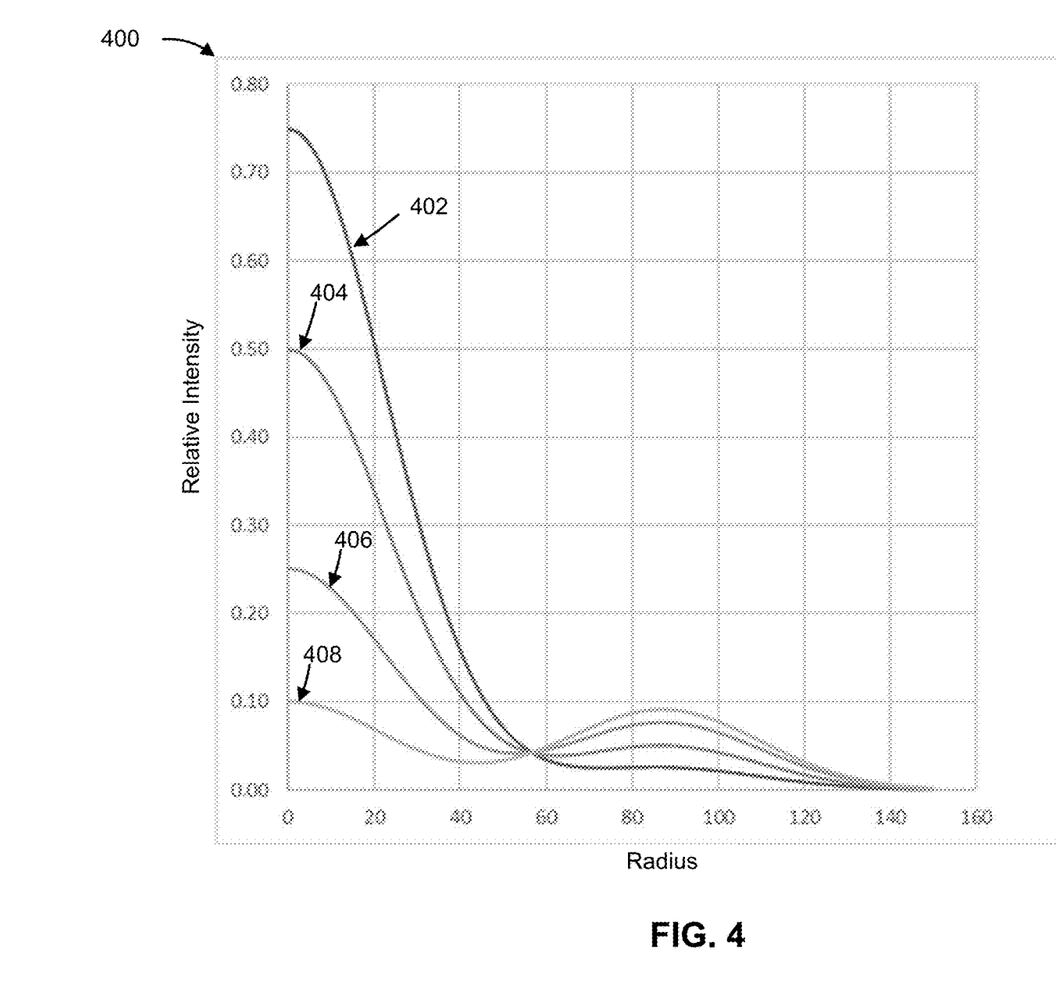
FIG. 4 is a plot illustrating example intensity profiles for output laser beams that comprise a combination of sub-beams that are formed by the beam splitting optic described herein.

FIG. 4 is a plot 400 illustrating example intensity profiles (e.g., relative intensities) as a function of radius (e.g., a distance, in μm, from a laser beam center) for four output laser beams 402-408 that comprise a combination of two laser sub-beams (e.g., the sub-beam 302 associated with the zero offset and the sub-beam 306 associated with a 90 μm offset) that are formed by the beam splitting optic 120. For example, the output laser beam 402 may comprise a mix ratio of 75% of the sub-beam 302 and 25% of the sub-beam 306, the output laser beam 404 may comprise a mix ratio of 55% of the sub-beam 302 and 50% of the sub-beam 306, the output laser beam 406 may comprise a mix ratio of 25% of the sub-beam 302 and 75% of the sub-beam 306, and the output laser beam 408 may comprise a mix ratio of 10% of the sub-beam 302 and 90% of the sub-beam 306. As shown in FIG. 4, an intensity profile of each output laser beam resembles a "pedestal," with a first peak associated with an output laser beam spike 208 and a second peak associated with an output laser beam ring 210. For example, an intensity profile associated with output laser beam 402 includes an output laser beam spike 208 with an intensity strength that is higher than that of each of the output laser beams 404-408.

Other intensity profiles may be formed by using other mix ratios, other offset values, and/or additional laser sub-beams (e.g., greater than two laser sub-beams). For example, as further shown in FIG. 4, the output laser beam 408 may provide approximately equal intensities for an output laser beam spike 208 and an output laser beam ring 210 (e.g., with a dip in intensity between the output laser beam spike 208 and the output laser beam ring 210). The output laser beam 408 may serve as a relatively flat-top profile output laser beam. When a more uniform flat-top is desired, then the beam splitting optic 120 may be configured to generate a third beam sub-beam that may be included in the output laser beam 408 (e.g., to fill in the dip between the output laser beam spike 208 and the output laser beam ring 210).

As indicated above, FIG. 4 is provided as an example. Other examples may differ from what is described with regard to FIG. 4.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A laser beam delivery system, comprising:
an optical beam launcher device that includes an optical relay system; and
a waveguide assembly, wherein:
the optical relay system includes a beam splitting optic that is configured to:
cause a laser beam that is input into the optical beam launcher device to be split into a first laser sub-beam and a second laser sub-beam,
cause the first laser sub-beam to transmit to a first region of an input lens of the waveguide assembly, and
cause the second laser sub-beam to transmit to a second region of the input lens of the waveguide assembly; and
the waveguide assembly is configured to transmit the first laser sub-beam and the second laser sub-beam from the input lens of the waveguide assembly to an output lens of the waveguide assembly via a waveguide of the waveguide assembly,
wherein the first laser sub-beam and the second laser sub-beam transmit from the waveguide assembly and form an output laser beam that includes two or more concentric portions.

2. The laser beam delivery system of claim 1, wherein the two or more concentric portions are one of:
an output laser beam spike and one or more output laser beam rings; or
two or more output laser beam rings.

3. The laser beam delivery system of claim 1, wherein the beam splitting optic includes one of:
a prism optic;
a wedge optic; or
a multi-faceted optic.

4. The laser beam delivery system of claim 1, wherein:
the first region is associated with a first lateral offset from an optical axis of the input lens of the waveguide assembly; and
the second region is associated with a second lateral offset from the optical axis of the input lens of the waveguide assembly.

5. The laser beam delivery system of claim 4, wherein the input lens of the waveguide assembly is configured to:
receive the first laser sub-beam at the first region of the input lens and transmit the first laser sub-beam at a first launch angle into a core of the waveguide of the waveguide assembly; and
receive the second laser sub-beam at the second region of the input lens and transmit the second laser sub-beam at a second launch angle into the core of the waveguide.

6. The laser beam delivery system of claim 1, wherein the optical relay system further includes an adjustment component that is configured to adjust a position of the beam splitting optic within some or all of a transmission path of the laser beam within the optical relay system.

7. The laser beam delivery system of claim 6, wherein the beam splitting optic is a multi-faceted optic that includes a plurality of facets arranged in a one-dimensional pattern or a two dimensional pattern on a surface of the beam splitting optic, and
wherein the adjustment component is configured to one-dimensionally or two-dimensionally adjust the position of the beam splitting optic within some or all of the transmission path of the laser beam.

8. The laser beam delivery system of claim 1, wherein the beam splitting optic is a multi-faceted optic that includes a plurality of facets, and at least one of:
a first facet, of the plurality of facets, comprises a planar facet; or
a second facet, of the plurality of facets, comprises a non-planar facet.

9. The laser beam delivery system of claim 1, wherein the beam splitting optic is a multi-faceted optic that includes a plurality of facets, and
wherein the plurality of facets includes a set of facets with respective sizes that satisfy a facet size threshold.

10. The laser beam delivery system of claim 1, wherein the beam splitting optic is a multi-faceted optic that includes a plurality of facets, and
wherein a facet, of the plurality of facets, includes at least one of:
a reflective characteristic;
a refractive characteristic; or
a diffractive characteristic.

11. A laser beam delivery system, comprising:
a waveguide assembly having an input lens, an output lens, and a waveguide therebetween; and
an optical beam launcher device that is configured to:
cause a laser beam that is input into the optical beam launcher device to be split into a first laser sub-beam and a second laser sub-beam,
cause the first laser sub-beam to transmit to a first region of the input lens,
wherein the first region is associated with a first lateral offset from an optical axis of the input lens, and
cause the second laser sub-beam to transmit to a second region of the input lens,
wherein the second region is associated with a second lateral offset from the optical axis of the input lens;
wherein the waveguide assembly is configured to transmit the first laser sub-beam and the second laser sub-beam from the input lens to the output lens via the waveguide, and
wherein the first laser sub-beam and the second laser sub-beam form an output laser beam that includes two or more concentric portions.

12. The laser beam delivery system of claim 11, wherein the optical beam launcher device includes one of:
a prism optic;
a wedge optic; or
a multi-faceted optic.

13. The laser beam delivery system of claim 11, wherein the optical beam launcher device includes a beam splitting optic that has at least one of:
a reflective characteristic;
a refractive characteristic; or
a diffractive characteristic.

14. The laser beam delivery system of claim 11, wherein the optical beam launcher device is configured to redirect at least a portion of the laser beam to cause the laser beam to be split into the first laser sub-beam and the second laser sub-beam.

15. The laser beam delivery system of claim 11, wherein the optical beam launcher device includes an adjustment component that is configured to adjust a position of a beam splitting optic within some or all of a transmission path of the laser beam within the optical beam launcher device.

16. The laser beam delivery system of claim 15, wherein the beam splitting optic is a multi-faceted disk optic that includes a plurality of facets azimuthally arranged on at least one surface of the multi-faceted disk optic, and wherein:
 the beam splitting optic has an axis of rotation that is approximately parallel to an optical axis of an input lens of the optical beam launcher device; and
 the adjustment component is configured to rotationally adjust, on the axis of rotation of the beam splitting optic, the position of the beam splitting optic within some or all of the transmission path of the laser beam.

17. The laser beam delivery system of claim 15, wherein the beam splitting optic is a multi-faceted polygon optic that includes a plurality of faceted edges, and wherein:
 the beam splitting optic has an axis of rotation that is approximately perpendicular to an optical axis of an input lens of the optical beam launcher device; and
 the adjustment component is configured to rotationally adjust, on the axis of rotation of the beam splitting optic, the position of the beam splitting optic within some or all of the transmission path of the laser beam.

18. A method, comprising:
 causing, by a laser beam delivery system, a laser beam that is input into the laser beam delivery system to be split into a first laser sub-beam and a second laser sub-beam;
 causing, by the laser beam delivery system, the first laser sub-beam to transmit to a first region of an input lens of a waveguide assembly,
  wherein the first region is associated with a first lateral offset from an optical axis of the input lens of the waveguide assembly;
 causing, by the laser beam delivery system, the second laser sub-beam to transmit to a second region of the input lens of the waveguide assembly,
  wherein the second region is associated with a second lateral offset from the optical axis of the input lens of the waveguide assembly; and
 causing, by the laser beam delivery system and via a waveguide of the waveguide assembly, the first laser sub-beam and the second laser sub-beam to be transmitted from the input lens of the waveguide assembly to an output lens of the waveguide assembly,
  wherein the first laser sub-beam and the second laser sub-beam form an output laser beam that includes two or more concentric portions.

19. The method of claim 18, wherein causing the first laser sub-beam to transmit to the first region of the input lens of the waveguide assembly, causing the second laser sub-beam to transmit to the second region of the input lens of the waveguide assembly, and causing the first laser sub-beam and the second laser sub-beam to be transmitted from the input lens of the waveguide assembly to the output lens of the waveguide assembly causes the output laser beam to form,
 wherein the output laser beam is a combination of the first laser sub-beam and the second laser sub-beam.

20. The method of claim 18, wherein the two or more concentric portions are one of:
 an output laser beam spike and one or more output laser beam rings; or
 two or more output laser beam rings.

* * * * *